United States Patent
Schoenbeck et al.

(10) Patent No.: US 6,435,352 B1
(45) Date of Patent: Aug. 20, 2002

(54) SORTING MACHINE FOR STACKS OF SHEET METAL PANELS

(75) Inventors: Elroy Schoenbeck; Kalin Liefer, both of County of Randolph, IL (US)

(73) Assignee: Red Bud Industries, Inc., Red Bud, IL (US)

( * ) Notice: Subject to any disclaimer, the term of this patent is extended or adjusted under 35 U.S.C. 154(b) by 0 days.

(21) Appl. No.: 09/536,071

(22) Filed: Mar. 24, 2000

(51) Int. Cl.⁷ .................................................. B07C 5/00
(52) U.S. Cl. .................. 209/509; 198/434; 198/457.01; 198/459.6; 414/790; 414/790.1; 414/789.8; 209/539
(58) Field of Search ............................ 198/434, 457.01, 198/459.6; 414/790, 790.1, 789.8

(56) References Cited

U.S. PATENT DOCUMENTS 3,887,060 A * 6/1975 Kamphues .................... 198/30

* cited by examiner

*Primary Examiner*—Donald P. Walsh
*Assistant Examiner*—Jonathan R Miller
(74) *Attorney, Agent, or Firm*—Polster, Lieder, Woodruff & Lucchesi, L.C.

(57) ABSTRACT

A sorting machine at the end of a sheet metal slitting and shearing line receives side-by-side stacks of sheet metal panels and separates and rearranges those stacks so that they are more easily wrapped, banded, or otherwise processed. The machine includes a roller conveyor which receives the side-by-side stacks and a platform located to one side of the conveyor. The platform has support beams which align with the rollers of the conveyor such that spaces exist between the succession of aligned rollers and support beams. Beneath the conveyor and platform a transfer carriage moves on tracks that extend transversely with respect to the conveyor. The carriage has transfer beams which occupy the spaces between successive aligned rollers and support beams. In addition, the carriage has lift cylinders which move the transfer beams from an elevated position in which the supporting surface formed by them is above the supporting surfaces formed by the rollers and support beams and a retracted position in which the supporting surface formed by the transfer beams is below the supporting surfaces formed by the rollers and support beams.

22 Claims, 6 Drawing Sheets

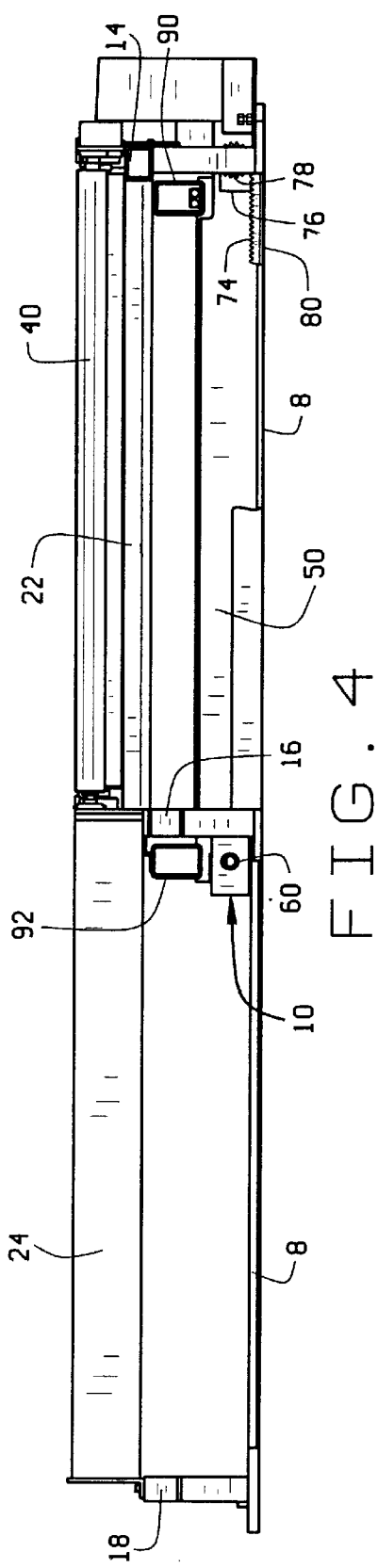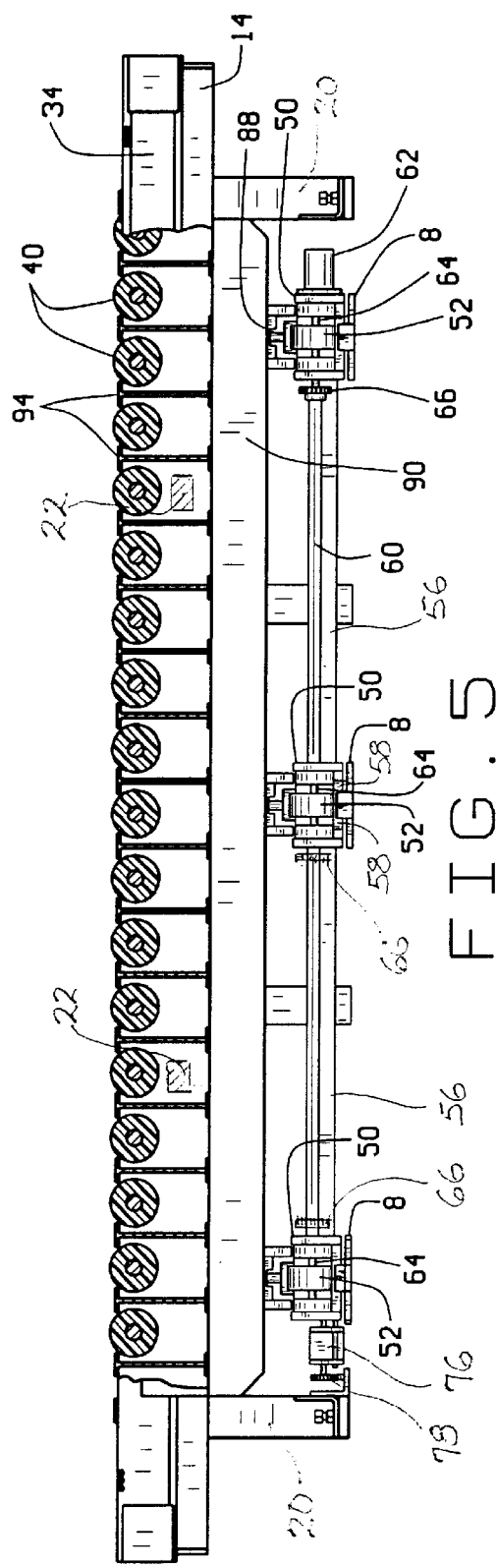

SORTING MACHINE FOR STACKS OF SHEET METAL PANELS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates in general to equipment for handling sheet metal and, more particularly, to a sorting machine for separating and arranging stacks of sheet metal panels.

Sheet metal finds widespread use in manufactured products, particularly in housings for appliances and other equipment and in cabinets of one sort or another. Most of this sheet metal comes in large coils produced at rolling mills. The manufacturers of the finished products slit and shear this sheet metal into panels of desired size for subsequent bending, stamping or other working. Some manufactures engage independent contractors to slit and shear the sheet metal. Irrespective of whomever performs the slitting and shearing, the panels derived from these operations accumulate in stacks which are often wrapped and banded and otherwise deposited for subsequent processing.

Typically, the coil of sheet metal is supported on a stand from which it is withdrawn and delivered to a feeding machine which advances it in measured increments into a slitting machine where it passes through rotary knives that slit it into side-by-side strips. Beyond, the slitting machine the strips passes into a shear which, at the end of each incremental advance, severs the strips transversely, producing multiple panels, the number of which depend on the number of slits imparted by the slitting machine. In any event, the dimensions of the panels derived depend on the spacing between the pairs of rotary knives on the slitting machine and the length of each incremental advance produced by the feeding machine. The shear deposits the panels in a stacking machine where they accumulate in a set of side-by-side stacks. When each stack of a set contains a prescribed number of panels, the stacking machine discharges the set of stacks onto a conveyor.

But the stacks of a set are no farther apart than the strips from which panels are sheared, and thus much too close for subsequent procedures such as wrapping or banding. The side-by-side stacks of the set must be separated and repositioned. This requires time—often more than the shearing machine takes to produce another set of side-by-side stacks. As a consequence, the separating and repositioning restricts the capabilities of the equipment which precedes it.

SUMMARY OF THE INVENTION

The present invention resides in a sorting machine having a conveyor and a transfer carriage that moves transversely with respect to the conveyor and further has the capacity to elevate objects from and lower them onto the conveyor. This enables the machine to rearrange stacks of side-by-side panels which are directed onto the conveyor.

DESCRIPTION OF THE DRAWINGS

FIG. 4 is an end elevational view of the sorting machine with its carriage beneath the conveyor;

FIG. 5 is a side view of the sorting machine; partially broken away and in section, with the section being along line 5–5 of FIG. 4;

DETAILED DESCRIPTION

Figure 1:
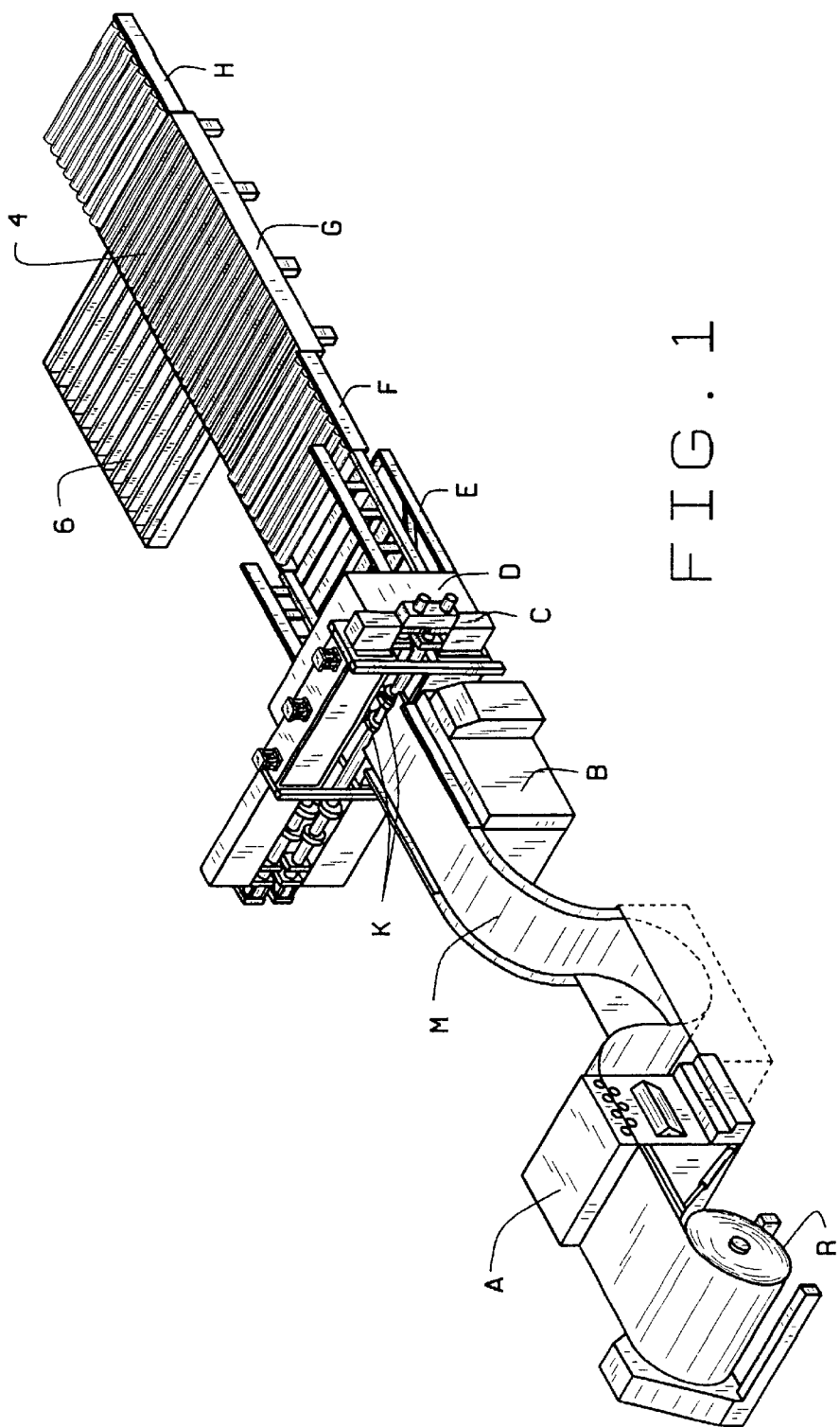
FIG. 1 is a perspective of several machines through which sheet metal passes to convert it into panels of prescribed dimensions which accumulate in stacks, and further shows the sorting machine of the present invention for separating and arranging the stacks so that they may be processed.

Referring now to the drawings (FIGS. 1 & 2), a metal sheet M, such as sheet steel, is supplied rolled into a coil R from which it is withdrawn by a straightening machine A which removes coil set. Beyond the straightening machine A the sheet M passes into feeding machine B which advances the sheet M in measured increments into a slitting machine C which in turn slits the sheet M longitudinally into several side-by-side strips S. To this end, the slitting machine C has circular knives K which are arranged in pairs—one of each pair below the sheet M and the other above it—with each pair producing a different slit. Immediately, beyond the slitting machine C, the strips S pass into a shearing machine D having a blade L which severs the strips S transversely, producing a separate panel P from each strip S. The shearing machine D discharges the panels P into a stacking machine E where they accumulate in side-by-side stacks T on a conveyor F, there being a separate stack T beyond the end of each strip S. Indeed, the stacks T, as the panels P accumulate in them, are spaced no farther apart than are the strips S in the metal sheet M. This is much too close for banding, wrapping or other processing. Once each stack T of a set of side-by-side stacks T has the prescribed number of panels P, the stacking machine E discharges the set of side-by-side stacks T onto a conveyor F which delivers the set of stacks T to a sorting machine G. Here the stacks T are spread apart and arranged one after the other. The sorting machine G delivers the stacks T to a conveyor H which in turn presents them for subsequent processing, such as wrapping or banding, or simply for removal and storage.

The straightening machine A, the feeding machine B, the slitting machine C, the shearing machine D, the stacking machine E and the two conveyors F and H are all available from Red Bud Industries, Inc., of Red Bud, Ill. Red Bud Industries owns U.S. Pat. No. 4,887,502 for a Machine for Slitting Metal Sheet, and that machine will suffice for the slitting machine C. On Nov. 13, 1998, Red Bud Industries filed U.S. patent application Ser. No. 09/139,300, now U.S. Pat. No. 6,092,709, for a Machine for Advancing a Sheet Metal Strip in Measured Increments, which machine will suffice for the feeding machine B.

Turning now to the sorting machine G, it includes (FIG. 3) a frame 2 which supports a conveyor 4 having feed and discharge ends and a platform 6 located to the side of the conveyor 4 between the feed and discharges ends. The frame 2 rests on a floor to which it is firmly secured. In addition, the machine G includes a several tracks 8 which are also attached firmly to the floor, where they extend transversely beneath the conveyor 4 and the platform 6 on the frame 2. Finally, the machine G has a transfer carriage 10 which rides on the tracks 8 and thus moves beneath the frame 2—indeed, between the conveyor 4 and the platform 6. The conveyor 4 at its feed end aligns with the conveyor F that leads from the stacking machine E. When a set of side-by-side stacks T has accumulated in the stacking machine E with the prescribed number of panels P in each, the stacking machine E discharges the set onto the conveyor F which in turn moves those stacks T onto the conveyor 4 of the sorting machine G. While more panels P accumulate to form another set of stacks T in the stacking machine E, the transfer carriage 10 and the conveyor 4 of the sorting machine G separate the stacks T and rearrange them, so that they pass off the conveyor 4 one after the other. To this end the transfer carriage 10 lifts the stacks T from the conveyor 4 and transfers them laterally, sometimes using the platform 6 to support the stacks T. The operation is such that the stacks T change from a side-by-side orientation to a successive orientation.

Figure 3:
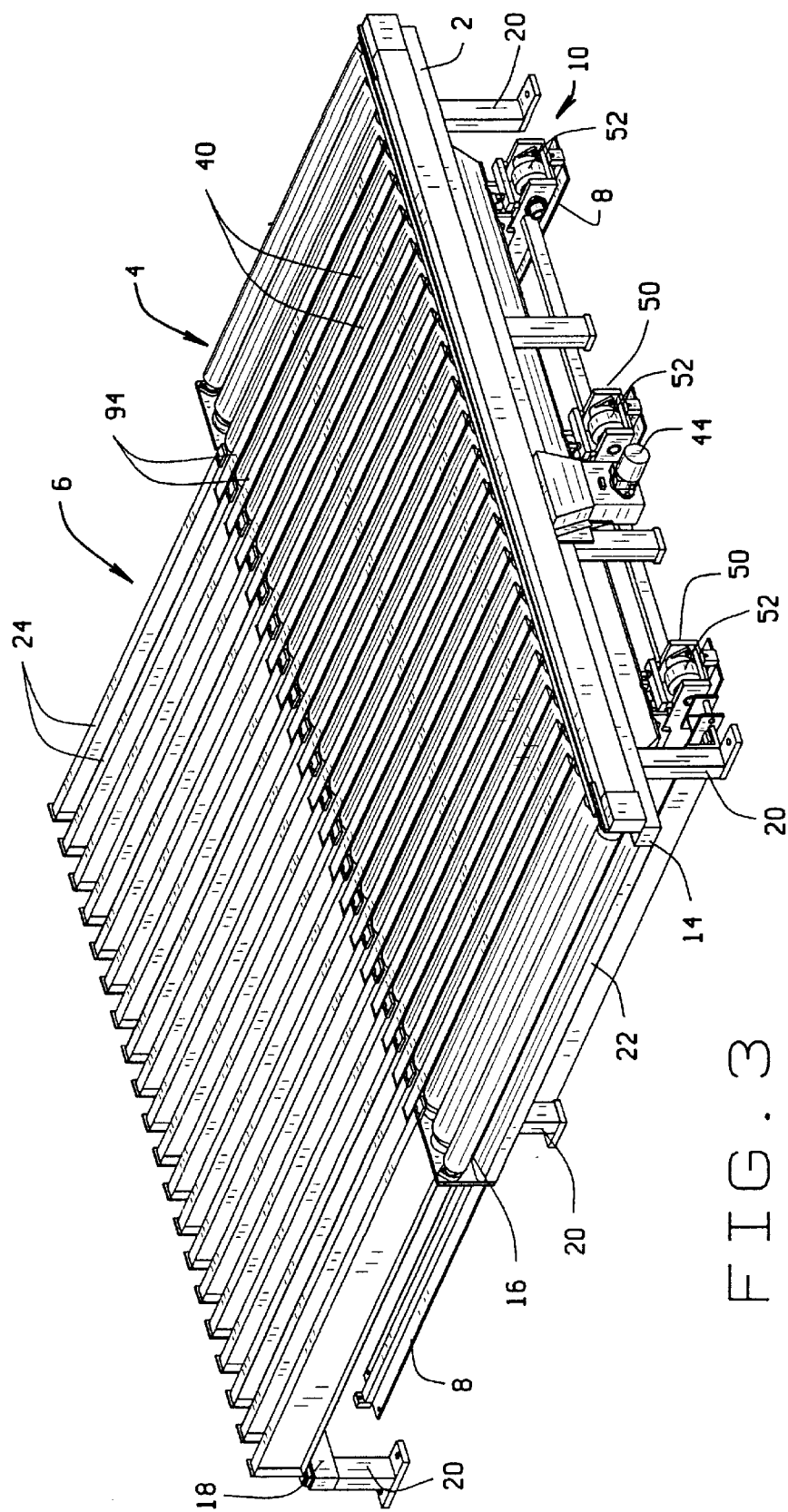
FIG. 3 is a perspective view of the sorting machine.
Figure 6:
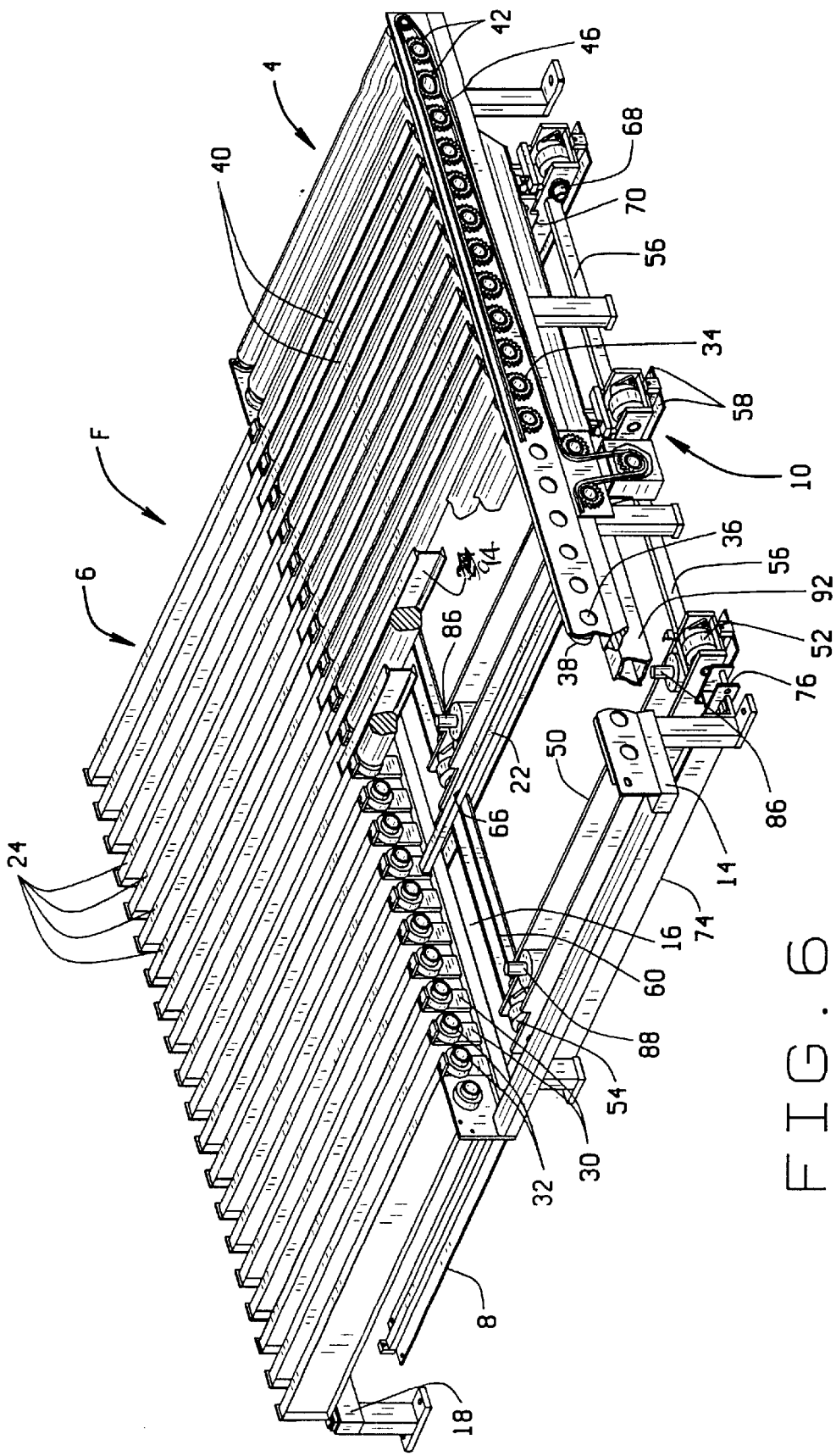
FIG. 6 is a perspective view of the sorting machine, partially broken away to show its carriage.

The frame 2 includes (FIGS. 3 & 4) three longitudinal members 14, 16 and 18 which lie parallel to each other and extend the full length of the sorting machine G. Each longitudinal member 14, 16 and 18 is supported above the underlying floor on several legs 20 which are secured firmly to the floor. The longitudinal members 14 and 16 are connected by cross members 22 (FIGS. 3 & 6). The conveyor 4 occupies the space between the members 14 and 16. The longitudinal members 16 and 18, on the other hand, support the platform 6. It consists of a succession of support beams 24—actually I-beams—which rest on the longitudinal members 16 and 18 and extend transversely between them with their webs oriented vertically and their flanges presented horizontally. The upper flanges for the beams 24 lie in a common horizontal plane and form a passive supporting surface.

The conveyor 4 (FIG. 6) includes a succession of end plates 30 located along the longitudinal beam 16, each at the end of a different support beam 24 for the platform 6. The plates 30 are fastened to their respective beams 24, with the spacing between successive plates 30 generally corresponding to the spacing between the flanges on successive support beams 24. The plates 30 carry antifriction bearings 32. In addition, the conveyor 4 has a side plate 34 which is secured to the longitudinal member 14 and lies parallel to the succession on end plates 30 on the center member 16. The side plate 34 has holes 36 which align with the bearings 32 on the end plates 30, and at each hole 36 the side plate 34 is fitted with another bearing 38. Thus, the bearings 32 and 38 are arranged in pairs, with one bearing 32 of each pair being on one of the end plates 30 and the other bearing 38 being on the side plate 34. Each pair of bearings 32 and 38 supports a roller 40 that bridges the space between the two longitudinal members 14 and 16. The rollers 40 and the support beams 24 are essentially equal in length so the conveyor 4 is wide as the staging platform 6. The upwardly presented surfaces of the rollers 40 form an active supporting surface which lies at the same elevation as the passive supporting surface formed by the upper flanges of the support beams 24.

The outer ends of rollers 40 project through the holes 36 (FIG. 6) in the side plate 34 and are fitted with sprockets 42. The longitudinal member 14 generally midway between its ends supports a hydraulic motor 44 (FIG. 3) which is connected to the sprockets 42 by an endless chain 46. Thus, when the motor 44 is energized, the rollers 40 revolve at the same velocity and in the same direction.

The tracks 8 extend transversely with respect to the frame 2, that is to say, parallel to the support beams 24 and the rollers 40 (FIGS. 5 & 6), and while they are located below the frame 2, they extend essentially the full distance between the longitudinal members 14 and 18. One of the tracks 8 lies immediately inside the legs 20 at the feed end of the conveyor 4. Another lies immediately inside the legs 20 at the discharge end of the conveyor 4. The remaining track 8 extends beneath the midregion of the frame 2. Each track 8 is bolted firmly to the floor.

Turning now to the transfer carriage 10, it includes (FIG. 6) three trucks 50, one over each of the tracks 8, with each truck 50 being long enough to extend from the side member 14 past the center member 16 (FIG. 4), and likewise, when the truck 50 is displaced on its track 8, from the other side member 18 past the center member 16. As such one end of the each truck 50 always lies beneath the conveyor 4, while the other end of the truck 50 always lies beneath the platform 6, irrespective of the position of the truck 50 on its track 8. Each truck 50 at the end beneath the conveyor 4 has a (FIG. 6) roller 52 and at its end beneath the platform 6 has another roller 54. The rollers 52 and 54 of a truck 50 rest on the track 8 that is beneath that truck 50 and roll along that track 8 when the truck 50 is displaced. The three trucks 50 are coupled together with tie bars 56. The center truck 50 at each of its ends is fitted with followers 58 (FIG. 5) which lie along the sides of the track 8 for that truck 50 and prevent the truck 50 from being displaced laterally from its track 8. Since the tie bars 56 join the other trucks 50 to the center truck 50, those other trucks 50 are likewise confined to their tracks 8.

The rollers 54 for all three trucks 50 are mounted on a common drive shaft 60 which extends through all of the trucks 50 and beyond the truck 50 at the discharge end of the conveyor 4. That truck 50 carries a hydraulic motor 62 (FIG. 5) which turns the shaft 60 which in turn rotates the rollers 54 so as to move the carriage 10 on the tracks 8. Not only do the rollers 54 power the carriage 10, but so do the rollers 52 at the opposite ends of the trucks 50. In this regard, the rollers 52 are mounted on axles 64 which rotate in their respective trucks 50. Each axle 64 is connected with the drive shaft 60 through a chain-and-sprocket drive 66. Thus, the motor 62, when energized, rotates all of the rollers 52 and 54 and thus changes the position of the carriage 10 beneath the frame 2.

Along one of the trucks 50 a tracking mechanism 74 (FIGS. 4 & 6) monitors the position of the transfer carriage 10 beneath the frame 2. It includes rotary sensor 76 having a sprocket 78 and a chain 80 with which the sprocket 78 is engaged. The chain 80 functions as a rack in that it causes the sprocket 78 to rotate as the carriage 10 moves along its tracks 8, and the sensor 76 produces a signal that reflects the position of the carriage 10 or at least enables a processor to ascertain that position.

Each of the trucks 50 is fitted with a lift cylinder 86 (FIG. 6) near its roller 52 and another lift cylinder 88 near its roller 54. The lift cylinders 86 for the three trucks 50 support a lift beam 90 (FIG. 4), whereas the lift cylinders 88 support another lift beam 92. The two lift beams 90 and 92 extend longitudinally over the trucks 50 parallel to each other and parallel to the three frame members 14, 16 and 18. The lift beam 92 always lies beneath the support beams 24 of the platform 6, whereas the lift beam 90 always lies beneath the rollers 40 of the conveyor 4, irrespective of the position of the carriage 10 on its tracks 8. The cylinders 86 and 88 move in unison between retracted and extended positions, thus raising and lowering the lift beams 90 and 92, but in both positions for the cylinders 86 and 88, the beams 90 and 92 remain below the support beams 24 and the conveyor rollers 40, respectively. Of course, when the cylinders 86 and 88 are in their extended positions, the beams 90 and 92 lie closer to the under surfaces of the support beams 24 and rollers 40, The support beams 90 and 92 carry transfer beams 94 (FIG. 5) which are attached firmly to the support beams 90 and 92 and project upwardly into the spaces between the support beams 24 of the platform 6 and the aligned spaces between the rollers 40 of the conveyor 4. Like the support beams 24, the transfer beams 94 are steel I-beams, the upper flanges of which form a movable supporting surface. When the lift cylinders 86 and 88 are retracted, that movable supporting surface lies below the coplanar supporting surfaces formed by the upper flanges of the support beams 24 and the upwardly presented faces of the rollers 40. When the lift cylinders 86 and 88 are extended, the movable supporting surface formed by the upper flanges of the transfer beams 94 lies above the supporting surfaces formed by the support beams 24 and the rollers 40.

Figure 2:
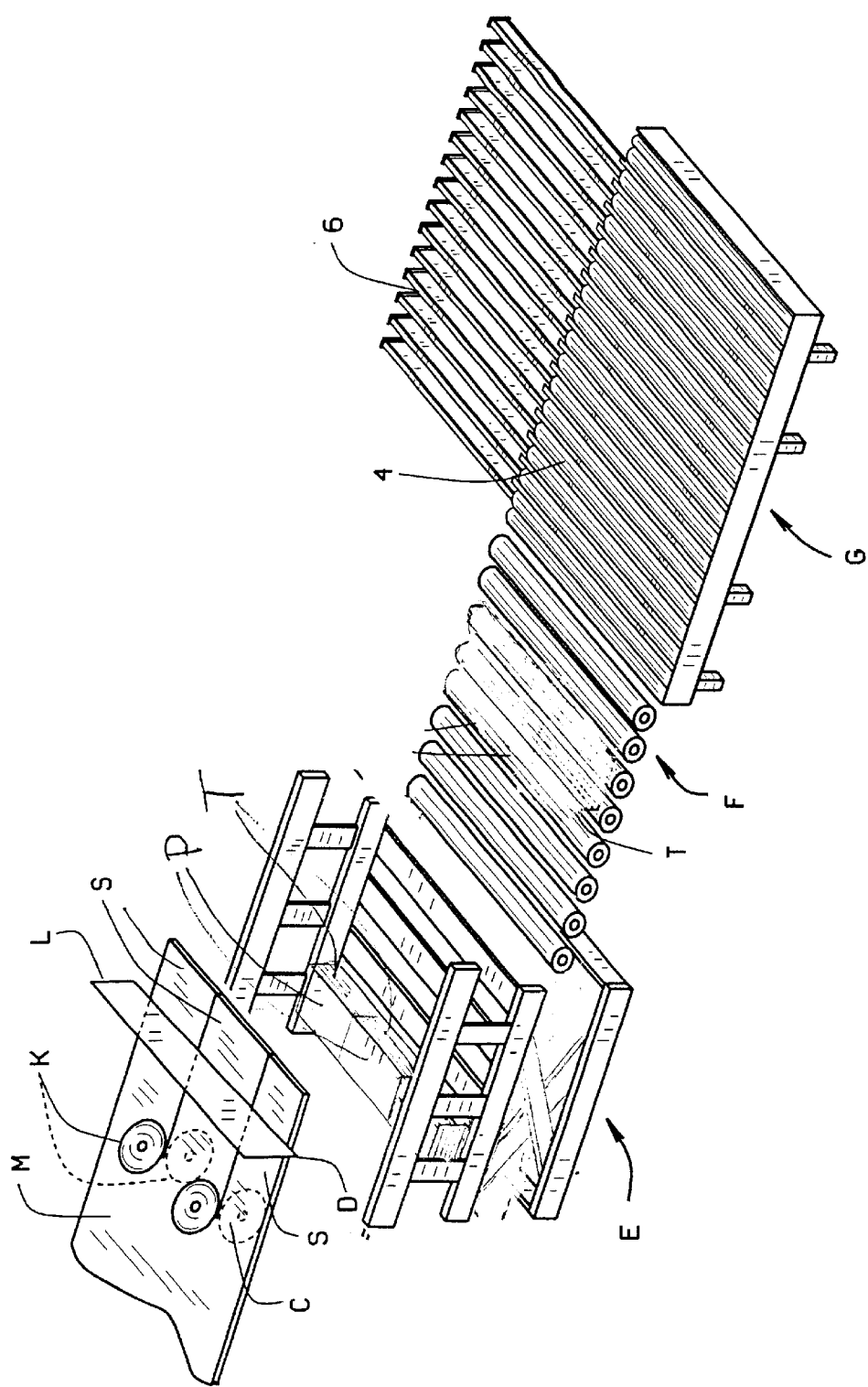
FIG. 2 is a schematic view in perspective of the slitting machine and the shearing machine, with sheet metal passing through them, and also showing the conveyor on which the panels accumulate in stacks and the sorting machine.
Figure 7A:
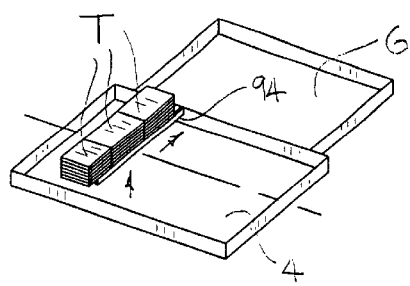
FIGS. 7A through 7H are schematic perspective views showing sequentially the separating and arranging of stacks by the machine.

The operation of the sorting machine G begins with the rollers 40 of the conveyor 4 at rest and the lift cylinders 86 and 88 of the transfer carriage 10 in their retracted positions, thus placing the movable supporting surfaces of the transfer beams 94 below the supporting surfaces of the rollers 40 and the support beams 24 (FIG. 5 ). As the knife L of shearing machine D shears panels P from the side-by-side strips S that emerge from the slitting machine C, the panels P accumulate in a set of side-by-side stacks T in the stacking machine E (FIG. 2). Once the stacks T of the set each contain a prescribed number of panels P, the stacking machine E discharges the set of stacks T onto conveyor F which delivers the stacks T to the conveyor 4 of the sorting machine G. At this time the motor 44 for the conveyor 4 of the sorting machine G is energized such that the rollers 40 of the conveyor 4 rotate in the direction which will move objects from the feed end toward the discharge end of the conveyor 4. The side-by-side stacks T move onto the active supporting surface formed by the rollers 40 of the conveyor 4 and those rollers 40 advance the stacks T to a position just beyond feed end of the conveyor 4, whereupon the motor 44 is de-energized (FIG. 7A). The stacks T come to rest on the conveyor 4, but being in the arrangement produced by the stacking machine E, they are much too close to individually wrap or band.

Figure 7B:
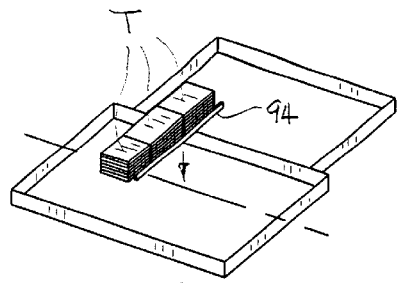

Next the motor 62 of the transfer carriage 10 is energized. It rotates the rollers 52 and 54 of carriage 10 in the direction which positions the transfer beams 94 beneath all of the stacks T. Thereupon, the lift cylinders 86 and 88 are energized, and they raise the transfer beams 94 above the supporting surfaces formed by the support bars 24 and rollers 40 (FIG. 7A). The stacks T rise with the beams 94. Then, with the beams 94 elevated, the motor 62 is energized to move the carriage 10 toward the platform 6. The stacks T on the transfer beams 94 move with the carriage 10 which transports those stacks T laterally until the first stack T, that is the stack T located closest to the longitudinal member 14, is at a desired position along the conveyor 4—usually midway between the sides of the conveyor 4 (FIG. 7B). Thereupon the cylinders 86 and 88 are retracted, and the transfer beams 94 deposits the stacks T on the coplanar supporting surfaces formed by the rollers 40 and the support beams 24, (FIG. 7B).

Figure 7C:
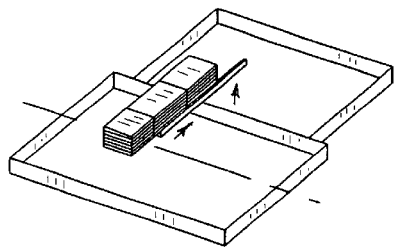

With the side-by-side stacks T resting on the rollers 40 and support beams 24, the motor 62 of the carriage 10 is energized to move the transfer beams 94 of the carriage 10 beneath the other stacks T, that is the stacks T located inwardly from the first stack (FIG. 7C). Again, the cylinders 86 and 88 are energized to elevate the transfer beams 94, and they lift the stacks T beneath which they are disposed off the rollers 40 and the support beams 24 (FIG. 7C).

Figure 7D:
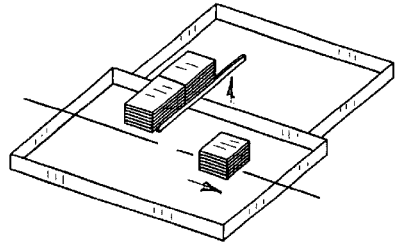
Figure 7E:
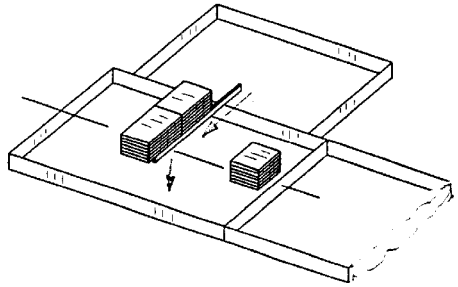

Then, while the transfer beams 94 are elevated, the motor 44 for the conveyor 4 is energized. The rollers 40 of the conveyor 4 rotate and move the first stack T toward the discharge end of the conveyor 4 (FIG. 7D). After the first stack T moves beyond side-by-side second and the remaining stacks, the motor 62 of the carriage 10 is again energized, this time in the reverse direction to bring the second stack T back toward the position formerly occupied by the first stack T—normally a position midway between the sides of the conveyor 4 (FIG. 7E). When the proper spacing develops between the first stack T and the second stack T, the motor 44 for the conveyor 4 is deenergized. At this time the lift cylinders 86 and 88 retract and lower the second and remaining stacks T onto the rollers 40 of the conveyor 4 (FIG. 7E). The second and remaining stacks T remain in place because the rollers 40 are at rest.

Figure 7F:
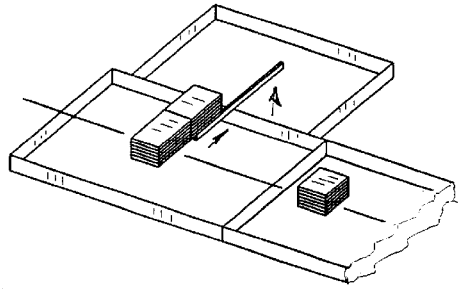

Thereupon, the motor 62 of the carriage 10 is energized to shift the transfer bars 94 out from beneath the second stack T and under only the third stack T (FIG. 7F). At this point the motor 62 is deenergized and the cylinders 86 and 88 are energized, raising the transfer beams 94 which in turn lift the third stack T from the rollers 40 of the conveyor 4 (FIG. 7F).

Figure 7G:
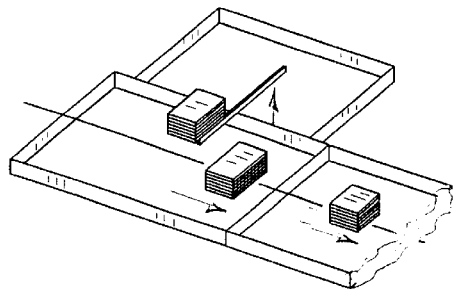

While the third stack T remains elevated, the motor 62 of the conveyor 4 is again energized, and its rollers 40 advance the second stack T toward the discharge end of the conveyor 4 and toward the conveyor H (FIG. 7G). At this juncture the second stack T advances directly behind the first stack T with good separation between the first and second stacks T (FIG. 7G).

Figure 7H:
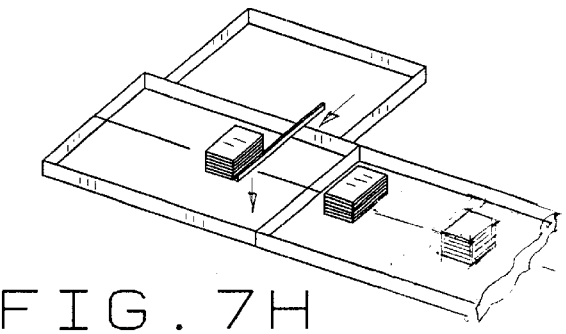

When the second stack T moves beyond the third stack T, the procedure is repeated. Briefly, the transfer beams 94 move the third stack T to a position directly behind the second stack T (FIG. 7.H). When the proper spacing develops between the second and third stacks, the rollers 40 for the conveyor 4 are stopped and the transfer beams 94 are lowered to their retracted position, thus depositing the third stack on the rollers 4 directly behind the second stack T (FIG. 7H). At this time the rollers 40 of the conveyor 4 rotate to advance the third stack T with good spacing between it and the second stack T. Thus, the stacks T advance one after the other along a desired position of the conveyor 4 for the sorting machine G and the subsequent conveyor H and with the desired spacing between the stacks T.

Other sequences of operation are available. After all, the conveyor 4, platform 6 and carriage 10 enable each stack T to be positioned anywhere between the sides of the conveyor 4 for subsequent advance in the selected lateral position and furthermore control the spacing between successive stacks T. Actually, the sorting machine G possesses the capacity arrange stacks T in a wide variety of patterns, depending on the sequence and the direction that its motor 44 for the conveyor 4, the motor 62 for the carriage 10, and the lift cylinders 86 and 88 on the carriage 10 are operated. That sequence may be regulated through manual operation of controls, or it may be controlled by a microprocessor. In any event, the sequence occurs as the panels P are sheared from the strips S at the shearing machine D and accumulate side-by-side in the stacking machine E.

What is claimed is:

1. In combination with a machine which shears panels from side-by-side strips of sheet metal and deposits those panels in a plurality of side-by-side stacks, with each stack containing a plurality of the sheet metal panels, a sorting machine for separating and arranging the stacks, said sorting machine comprising: a conveyor having a feed end onto which the plurality of side-by-side stacks is directed and a discharge end; and a transfer carriage that moves transversely with respect to the direction the feed conveyor advances the stacks, the transfer carriage having the capacity to elevate stacks from and lower stacks onto the conveyor, so that the spacing between and the arrangement of the stacks may be altered.

2. The combination according to claim 1 wherein the conveyor includes a succession of conveying rollers which form a first supporting surface and a motor coupled to the rollers for rotating the rollers.

3. The combination according to claim 2 wherein the carriage includes transfer beams located in the spaces between the conveying rollers and forming a second supporting surface, and lift cylinders for moving the transfer beams between elevated and retracted positions, the second supporting surface being above the first supporting surface when in the elevated position and being below the first supporting surface when in the retracted position, whereby the transfer beams can lift stacks from the conveyor.

4. In combination with a machine which shears panels from a strip of sheet metal and deposits those panels in a plurality of stacks, a sorting machine for separating and arranging the stacks, said sorting machine comprising: a conveyor having a feed end onto which the plurality of stacks are directed and a discharge end, the conveyor including a succession of conveying rollers which are spaced apart and form a first supporting surface and a motor coupled to the rollers for rotating them; a transfer carriage that moves transversely with respect to the direction the feed conveyor advances the stacks, the transfer carriage having the capacity to elevate stacks from and lower stacks onto the conveyor, so that the spacing between and the arrangement of the stacks may be altered, the carriage including transfer beams located in the spaces between the conveying rollers and forming a second supporting surface, and lift cylinders for moving the transfer beams between elevated and retracted positions, the second supporting surface being above the first supporting surface when the transfer beams are in the elevated position and being below the first supporting surface when in the retracted position, whereby the transfer beams can lift stacks from the conveyor; and a platform located to the side of the conveyor and having a succession of support beams which are spaced apart and form a third supporting surface, the support beams and the conveying rollers being longitudinally aligned, with the spaces between the support beams aligning with the spaces between the rollers and also receiving the support beams.

5. The combination according to claim 4 wherein the first and third supporting surfaces are essentially at the same elevation.

6. The combination according to claim 5 wherein the carriage includes trucks which are located below the conveyor and the platform and have truck rollers; and wherein the lift cylinders are on the trucks.

7. The combination according to claim 6 wherein each truck has two ends and one of the truck rollers is at one end and another of the truck rollers is at the other end; and wherein one of the truck rollers on each truck always lies beneath the conveyor and the other truck roller on the truck always lies beneath the platform.

8. The combination according to claim 7 wherein carriage also includes a motor which is coupled to at least some of the truck rollers for rotating that truck roller to thereby move the carriage transversely with respect to the conveyor.

9. A sorting machine for separating and arranging stacks of sheet metal panels, said machine comprising: a conveyor including a succession of parallel conveying rollers which are spaced apart and form a first supporting surface, the conveyor also including a first motor which is connected to the conveying rollers for rotating the conveying rollers; a platform located along one side of the conveyor and including support beams which are spaced apart and form a second supporting surface, the support beams aligning longitudinally with the conveying rollers and the spaces between the support beams aligning with and opening into the spaces between the conveying rollers; tracks located beneath the conveyor and platform and extending parallel to the aligned spaces between the conveying rollers and support beams; and a transfer carriage located on the tracks and movable along the tracks, the carriage having transfer beams which are located in the aligned spaces between the conveying rollers and support beams, with the transfer beams forming a third supporting surface, the transfer beams being movable between an elevated position, wherein the third supporting surface is above the first and second supporting surfaces, and a retracted position, wherein the third supporting surface is below the first and second supporting surfaces, whereby stacks on the conveyor may be arranged.

10. A sorting machine according to claim 9 wherein the first and second supporting surfaces are essentially at the same elevation.

11. A sorting machine according to claim 10 wherein the transfer carriage includes a truck over each track, with each truck having truck rollers that roll along the track for the truck.

12. A sorting machine according to claim 11 and further comprising a second motor on the carriage and connected to at least some of the truck rollers for rotating the truck rollers and moving the carriage over the tracks.

13. A sorting machine according to claim 12 wherein each truck has two ends located along the track over which the truck extends and has one of the truck rollers at its one end and another of the truck rollers at its other end; wherein the carriage also includes lift cylinders mounted on the trucks and connected to the transfer beams for moving the transfer beams between their elevated and retracted positions.

14. A sorting machine according to claim 13 wherein the carriage also includes lift beams which extend beneath the transfer beams and are attached to the transfer beams; and wherein the lift cylinders operate against the lift beams.

15. A sorting machine according to claim 14 wherein the carriage has two lift beams, with one remaining always beneath the conveyor and the other remaining always beneath the platform.

16. A sorting machine according to claim 15 and further comprising: a frame on which the conveyor and the platform are supported; the frame having legs located between the two lift beams of the carriage.

17. A sorting machine for separating and arranging stacks of sheet metal panels, said machine comprising: a conveyor including a succession of parallel conveying rollers which are spaced apart and form a first supporting surface, the conveyor also including a first motor which is connected to the conveying rollers for rotating the conveying rollers; tracks located beneath the conveyor and extending parallel to the spaces between the conveying rollers; a platform having support beams that form a second supporting surface, the support beams being aligned with the conveying rollers and being spaced apart, with the spaces between the support beams aligning with the spaces between the conveying rollers; and a transfer carriage located on the tracks and having a second motor for moving it along the tracks, the carriage also having transfer beams which are located in the spaces between the conveying rollers, with the transfer beams forming a third supporting surface, the transfer beams being movable between an elevated position, wherein the third supporting surface is above the first and second supporting surfaces and a retracted position, wherein the third supporting surface is below the first and second supporting surfaces, whereby stacks on the conveyor may be arranged.

18. A sorting machine according to claim 17 wherein the transfer carriage includes a truck over each track, with each truck having truck rollers that roll along the track for the truck.

19. A sorting machine according to claim 18 wherein each truck has two ends located along the track over which the truck extends and has one of the truck rollers at its one end and another of the truck rollers at its other end; wherein the carriage also includes lift cylinders mounted on the trucks and connected to the transfer beams for moving the transfer beams between their elevated and retracted positions.

20. A sorting machine according to claim 19 wherein the carriage also includes lift beams which extend beneath the transfer beams and are attached to the transfer beams; and wherein the lift cylinders operate against the lift beams.

21. In combination with a slitting machine having knives which slit sheet metal into a plurality of side-by-side strips and with a shearing machine having a blade with severs the strips transversely to produce panels which accumulate in side-by-side stacks of panels, a sorting machine for separating the stacks so that the individual stacks are more accessible without interference from formerly adjacent studs, said sorting machine comprising: a conveyor onto which the side-by-side stacks are placed, the conveyor including a plurality of spaced apart rollers which form a first conveying surface along which the stacks are advanced; and a carriage movable with respect to the conveyor in directions transverse to the direction that the conveyor moves the stacks, the carriage having spaced apart transfer beams located in the spaces between the rollers of the conveyor to form a second supporting surface, the elevation of the transfer beams relative to the conveyor being alterable between an elevated position wherein the second supporting surface is above the first supporting surface and a retracted position wherein the second supporting surface is below the first supporting surface.

22. The combination according to claim 21 and further comprising a platform located to the side of the conveyor and having spaced apart support beams which align longitudinally with the rollers of the conveyor, whereby the spaces between the support beams align with the spaces between the rollers, so that the transfer beams of the carriage can move in the spaces between the support beams, the support beams forming a third supporting surface that is essentially at the elevation of the first supporting surface.

* * * * *